United States Patent
Vajravel et al.

(10) Patent No.: US 12,001,249 B2
(45) Date of Patent: Jun. 4, 2024

(54) MANAGING PERIPHERALS IN A WORKSPACE ENVIRONMENT

(71) Applicant: Dell Products L.P., Round Rock, TX (US)

(72) Inventors: Gokul Thiruchengode Vajravel, Bangalore (IN); Srinivasa Ragavan Rajagopalan, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 17/685,146

(22) Filed: Mar. 2, 2022

(65) Prior Publication Data
US 2023/0280801 A1  Sep. 7, 2023

(51) Int. Cl.
G06F 1/16       (2006.01)
G06Q 10/02      (2012.01)
G06Q 10/0631    (2023.01)
G06Q 30/0601    (2023.01)
G06Q 50/10      (2012.01)

(52) U.S. Cl.
CPC ............ *G06F 1/169* (2013.01); *G06F 1/1656* (2013.01)

(58) Field of Classification Search
CPC ................. G06Q 10/1093; H04L 43/0876
See application file for complete search history.

(56) References Cited

U.S. PATENT DOCUMENTS

| | | | |
|---|---|---|---|
| 9,325,595 B1* | 4/2016 | O'Donovan | H04L 43/0876 |
| 2006/0015375 A1* | 1/2006 | Lee | G06Q 10/10 |
| | | | 705/5 |
| 2008/0140416 A1* | 6/2008 | Shostak | H04M 1/6041 |
| | | | 704/270.1 |
| 2010/0017245 A1* | 1/2010 | Kristiansen | G06Q 10/02 |
| | | | 705/5 |
| 2018/0190051 A1* | 7/2018 | Outwater | H04L 63/102 |
| 2023/0049989 A1* | 2/2023 | Franc De Ferriere | G06Q 10/02 |

* cited by examiner

*Primary Examiner* — Getente A Yimer
(74) *Attorney, Agent, or Firm* — Kirton McConkie; Brian Tucker

(57) ABSTRACT

Peripherals can be managed in a workspace environment. Peripherals can be associated with hoteling cubes to enable the inclusion of the peripherals in workspaces at the hoteling cubes to be managed. Users can be enabled to request the inclusion of additional peripherals in workspaces at the hoteling cubes. Users can also be enabled to include their own peripherals in workspaces at the hoteling cubes.

17 Claims, 18 Drawing Sheets

| Cube ID | Cube-Specific Peripheral Table 501 | | | |
|---|---|---|---|---|
| | Peripheral Name | Peripheral Device ID | Peripheral Unique ID | Interface |
| Cube ID1 | USB Keyboard | Device_ID_1 (e.g., USB\VID_XXXX&PID_YYYY) | Unique_ID_1 (e.g., serial number, container ID, ...) | USB |
| | USB Mouse | Device_ID_2 | Unique_ID_2 | USB |
| | USB Webcam | Device_ID_3 | Unique_ID_3 | USB |
| | ... | | | |

| Cube-To-Peripheral Mapping Table 502 ||||||
|---|---|---|---|---|
| Cube ID | Booked Slots | Peripheral Name | Peripheral Device ID | Peripheral Unique ID | Interface |
| Cube ID1 | • 02182022_1000_1700<br>• ... | • USB Keyboard<br>• USB Mouse<br>• USB Webcam | • Device_ID_1<br>• Device_ID_2<br>• Device_ID_3 | • Unique_ID_1<br>• Unique_ID_2<br>• Unique_ID_3 | • USB<br>• USB<br>• USB |
| Cube ID2 | • 02182022_0900_1300<br>• 02182022_1400_1800<br>• ... | • USB Keyboard<br>• USB Mouse<br>• BT Headset | • Device_ID_1<br>• Device_ID_2<br>• Device_ID_4 | • Unique_ID_4<br>• Unique_ID_5<br>• Unique_ID_6 | • USB<br>• USB<br>• BT |
| Cube ID3 | • 02192022_0900_1800<br>• ... | • USB Keyboard<br>• USB Mouse<br>• 4K Display | • Device_ID_1<br>• Device_ID_2<br>• Device_ID_5 | • Unique_ID_7<br>• Unique_ID_8<br>• Unique_ID_9 | • USB<br>• USB<br>• HDMI |
| | ... | | | | |

| User ID | Approved Peripheral Table 503 ||||
| | Peripheral Name | Peripheral Device ID | Peripheral Unique ID | Interface |
| --- | --- | --- | --- | --- |
| User-1 ID | USB Headset | Device_ID_11 | Unique_ID_11 | USB |
| User-2 ID | Pen Drive | Device_ID_12 | Unique_ID_12 | USB |
| ⋮ | | ⋮ | ⋮ | |

*FIG. 5C*

MANAGING PERIPHERALS IN A WORKSPACE ENVIRONMENT

CROSS-REFERENCE TO RELATED APPLICATIONS

N/A

BACKGROUND

A user may oftentimes use his or her client computing device in a workspace. In this context, a workspace can be viewed as an environment that includes a client computing device and one or more peripherals to which the client computing device may be connected. Such peripherals may commonly include external displays, a keyboard, a mouse, a printer, a dock, etc.

FIG. 1 provides an example of a workspace 100. As shown, workspace 100 includes client computing device 110 and various peripherals including a headset 111, a webcam 112, an external monitor 113, a large format display 114, a pen 115, a dock 116, a speakerphone 117, a keyboard 118, a mouse 119 and a sound bar 120, among possibly other peripherals. Client computing device 110 could be connected to these peripherals in any available way.

A workspace may oftentimes be used for hybrid work scenarios. For example, a business may have an office space that includes hoteling cubes that can be assigned to, reserved by or otherwise utilized by the business's employees as workspaces. In such cases, the business may allow its employees to connect their laptops to a dock in a particular hoteling cube where various peripherals may be available for use. As another common example, an office space company may provide a coworking option in which multiple companies pay for hoteling cubes in the same office space where their employees can establish their workspaces. In such cases, the office space company may charge different amounts per hoteling cube based on which peripherals are available in the hoteling cube (e.g., by charging more for a hoteling cube with a 4K display). Other scenarios also exist where a user may establish a workspace in a hoteling cube or other similar location.

In an office space that provides hoteling cubes, it can be difficult for an administrator to manage peripherals. For example, to track which peripherals are available at each hoteling cube, an administrator would typically need to add each peripheral to a hoteling management system, associate each peripheral with the representation of the corresponding hoteling cube in the hoteling management system, and then deliver each peripheral to the corresponding hoteling cube. If the administrator happens to deliver a peripheral to the wrong hoteling cube, there will not be a way to identify the peripheral within the hoteling management system.

An administrator may also desire to place restrictions on which peripherals can be used in a workspace at a particular hoteling cube. For example, some hoteling cubes in an office space may have 4K webcams, and an office space company may charge more for use of such hoteling cubes. However, if an administrator cannot prevent 4K webcams from being used in workspaces at the hoteling cubes, a user could simply take the 4K webcam from the higher-priced hoteling cube and use it in a lower-priced hoteling cube.

Similarly, an administrator may desire to allow a user to use a particular peripheral in his or her workspace (e.g., by paying an added cost to use a 4K webcam) regardless of the hoteling cube the user may be using. In other words, the administrator may not want to force the user to go to a particular hoteling cube to be able to use a particular peripheral. However, there may not be a way for the administrator to manage and control such use cases.

An administrator may also desire to place restrictions on how a peripheral is used as opposed to whether a peripheral may be used. For example, the administrator may desire to allow users to bring their own peripherals but only if the administrator can implement appropriate security mechanisms (e.g., read-only access to a storage drive).

Existing hoteling management systems do not provide a way, or may only provide limited ways, to address such desires. With existing hoteling management systems, peripheral management is a manual process and therefore is not scalable.

BRIEF SUMMARY

The present invention extends to systems, methods and computer program products for managing peripherals in a workspace environment. Peripherals can be associated with hoteling cubes to enable the inclusion of the peripherals in workspaces at the hoteling cubes to be managed. Users can be enabled to request the inclusion of additional peripherals in workspaces at the hoteling cubes. Users can also be enabled to include their own peripherals in workspaces at the hoteling cubes.

In some embodiments, the present invention may be implemented as a method for managing peripherals in a workspace environment. In conjunction with a user booking a hoteling cube, one or more peripherals that are associated with the hoteling cube can be identified. Peripheral information for the one or more peripherals can be cached on a client computing device. In conjunction with determining that the client computing device is establishing a workspace at the hoteling cube, the peripheral information can be used to allow the one or more peripherals to be included in the workspace while preventing one or more other peripherals from being included in the workspace.

In some embodiments, the present invention may be implemented as computer storage media storing computer executable instructions which when executed implement a method for managing peripherals in a workspace environment. A client computing device can receive a request to include a first peripheral in a workspace that the client computing device has established or will establish at a first hoteling cube. It can be determined that the first peripheral is associated with a second hoteling cube. An agent on the client computing device can be notified that the first peripheral is available at the second hoteling cube. A user of the client computing device can then be notified that the first peripheral is available at the second hoteling cube.

In some embodiments, the present invention may be implemented as a method for managing peripherals in a workspace environment. An agent executing on a client computing device can retrieve peripheral information for one or more peripherals that are associated with a hoteling cube at which a user of the client computing device has established or will establish a workspace. The agent can share the peripheral information with a filter driver on the client computing device. When the user has connected the one or more peripherals to the client computing device at the hoteling cube, the filter driver can use the peripheral information to determine that the one or more peripherals should be included in the workspace.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 5A-5C provide examples of various data structures that may be employed in one or more embodiments of the present invention;

DETAILED DESCRIPTION

In this specification and the claims, the term "client computing device" should be construed as encompassing any computing device that an individual may personally use such as a desktop, laptop, tablet, smart phone, etc. The term "peripheral" should be given its ordinary meaning and should encompass, but not be limited to, the examples given in the background. The term "workspace" should be construed as encompassing a client computing device and one or more peripherals to which the client computing device is connected, whether wired or wireless. The term "hoteling cube" should be construed as a physical location where a workspace can be implemented. The term "office space" will be used to represent a collection of hoteling cubes. An office space may be a single physical location (e.g., a single building) but could also span multiple physical locations (e.g., multiple buildings). Although embodiments of the present invention are described primarily in the context of a Windows-based implementation, the present invention could be implemented in any operating system environment that supports the described functionality.

Figure 1:
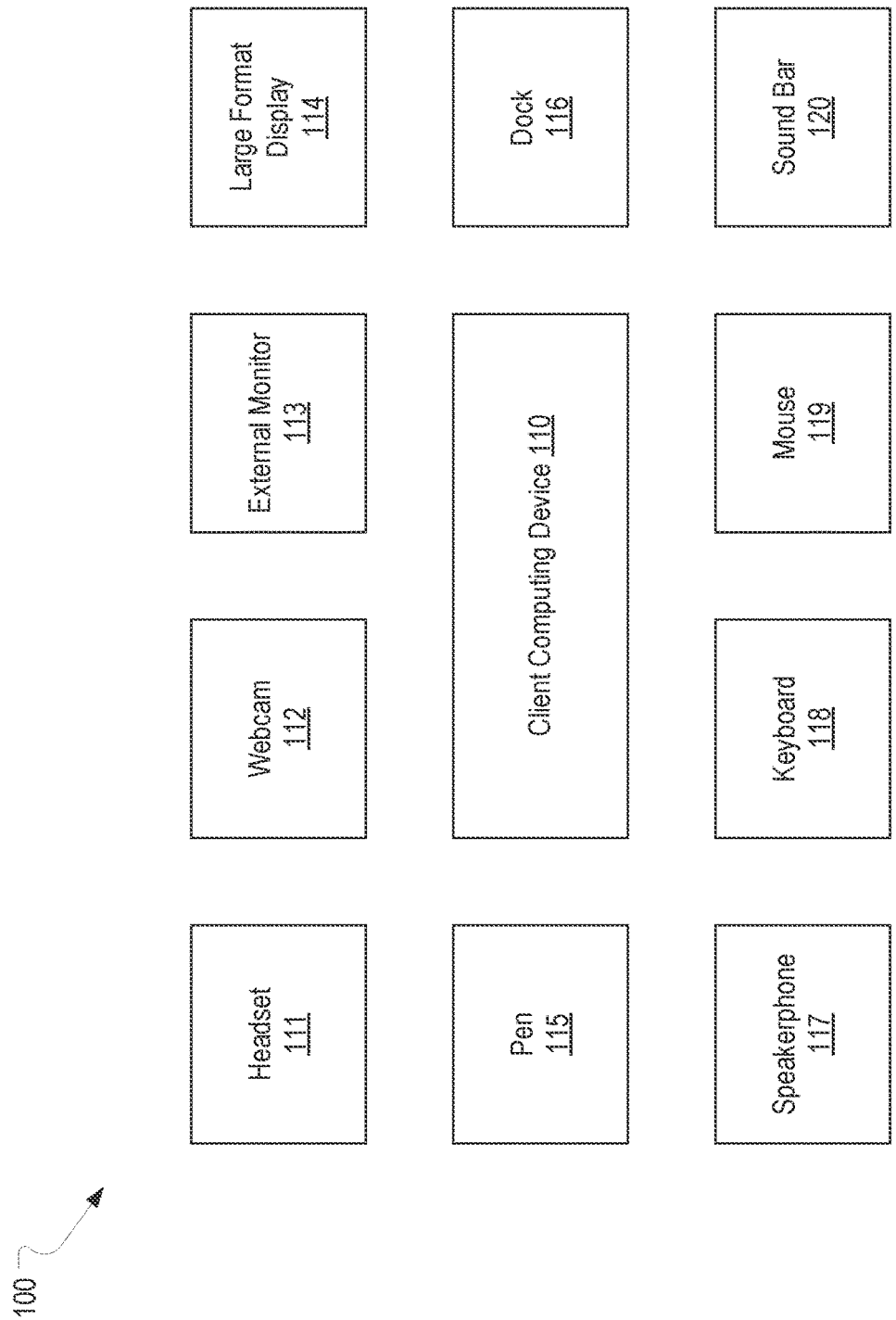
FIG. 1 provides an example of a workspace.
Figure 2:
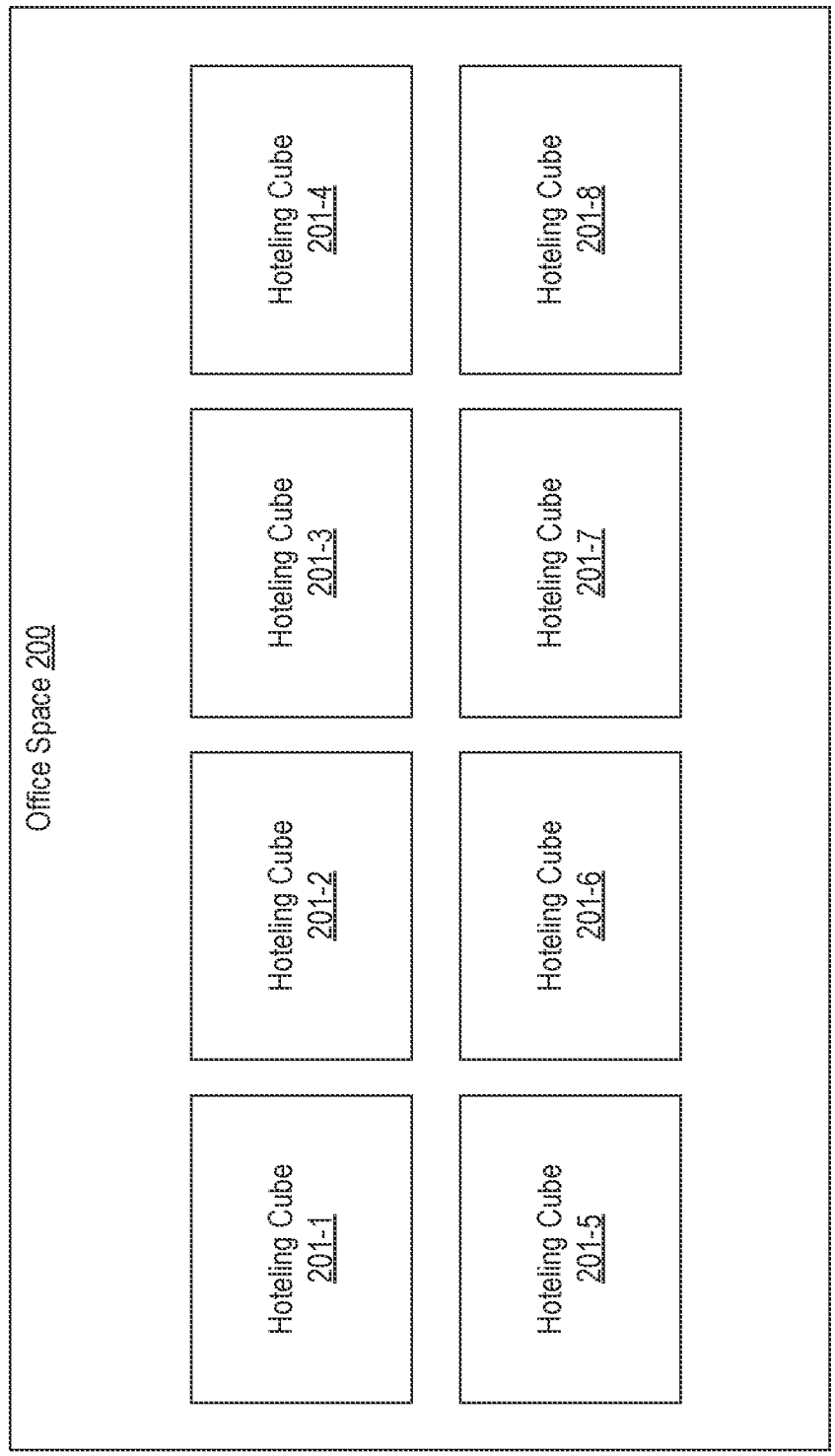
FIG. 2 provides an example of an office space that includes hoteling cubes and represents an environment in which one or more embodiments of the present invention could be implemented.

FIG. 2 provides a simple example of an office space 200 that includes eight hoteling cubes 201-1 through 201-8 (generally hoteling cube(s) 201). Of course, an office space could have any reasonable number of hoteling cubes. In a typical scenario, users, such as employees, may be able to work in any (or at least one) of hoteling cubes 201 within which they may establish or implement workspaces. For example, employees may be able to connect their laptops to a dock in any of hoteling cubes 201 during the workday to create a workspace. One or more peripherals could be connected to the dock or the user's laptop and may therefore form part of the workspace. In some embodiments, a hoteling cube 201 could be a meeting room or other special purpose area.

As introduced in the background, there may be scenarios where different peripherals are available in hoteling cubes 201, and an administrator may desire to prevent users from moving the peripherals for use in workspaces in different hoteling cubes 201. There may also be scenarios where an administrator may desire to allow users to move peripherals between hoteling cubes 201 while managing, restricting, or otherwise controlling how the peripherals are used in workspaces. There could also be scenarios where an administrator may desire to allow users to bring their own peripherals for use in a workspace in a particular hoteling cube 201 while managing, restricting, or otherwise controlling how the peripherals are used. In short, an administrator may desire to manage and have control over the inclusion of peripherals in workspaces that are established in hoteling cubes 201. Embodiments of the present invention can facilitate such management.

Figure 3:
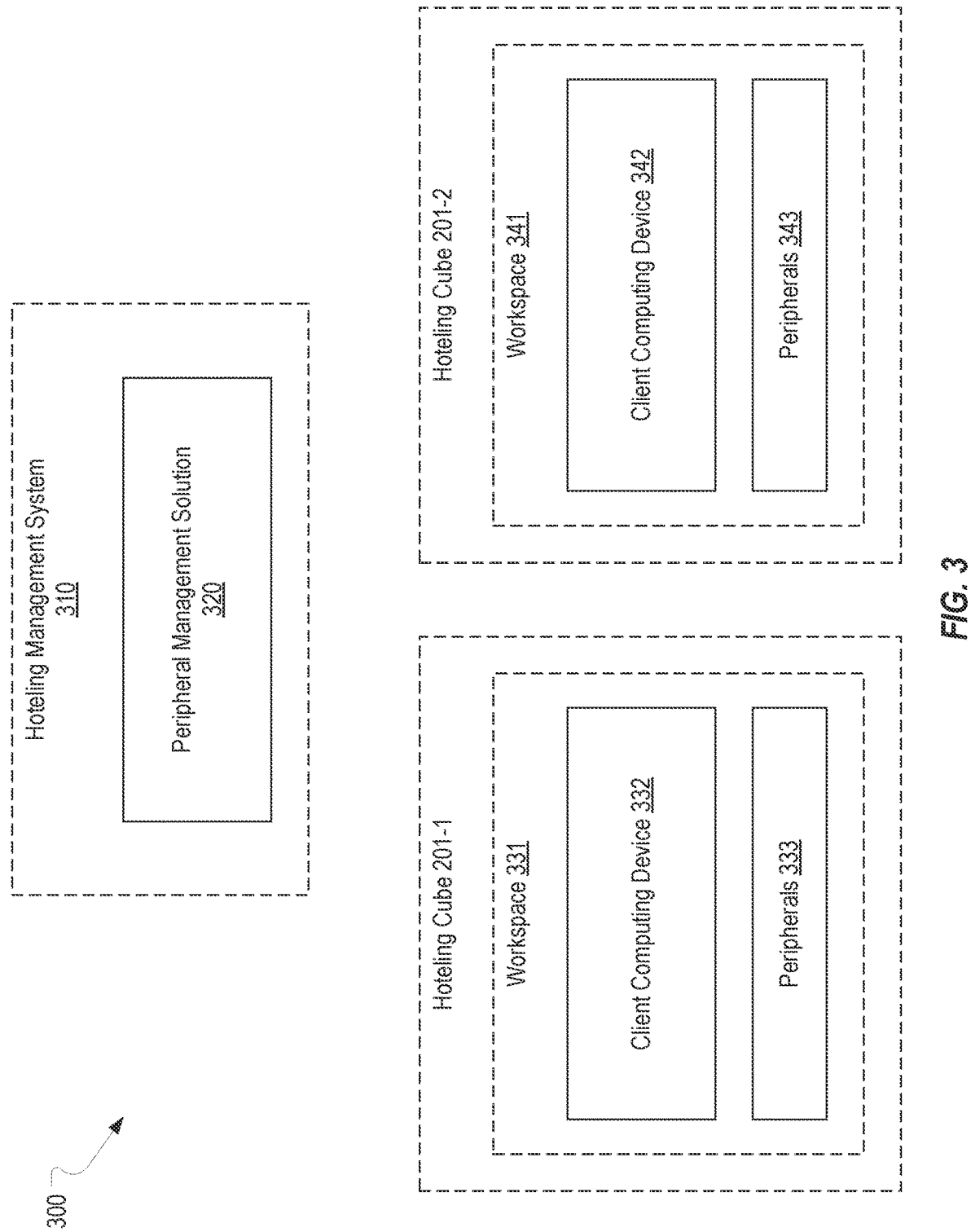
FIG. 3 provides an example of a computing environment in which one or more embodiments of the present invention may be implemented.

FIG. 3 provides an example of a computing environment 300 in which embodiments of the present invention may be implemented. Computing environment 300 includes a peripheral management solution 320 which may, but need not be, part of or integrated with a hoteling management system 310 such as AppSpace. As an example, hoteling management system 310 may provide booking functionality by which a user can reserve one of hoteling cubes 201 among other functionality that may be commonly provided by existing hoteling management systems. Peripheral management solution 320, possibly in conjunction with hoteling management system 310, could be implemented on a server, in the cloud, or at some other location accessible to the various client computing devices that may form workspaces in office space 200 and possibly other office spaces. Computing environment 300 is also assumed to have two existing workspaces 331 and 341 in hoteling cubes 201-1 and 201-2 respectively. Workspace 331 consists of a client computing device 332 and peripherals 333, and workspace 341 consists of a client computing device 342 and peripherals 343. Of course, users could implement workspaces in the other hoteling cubes 201 at any given time.

Figure 4:
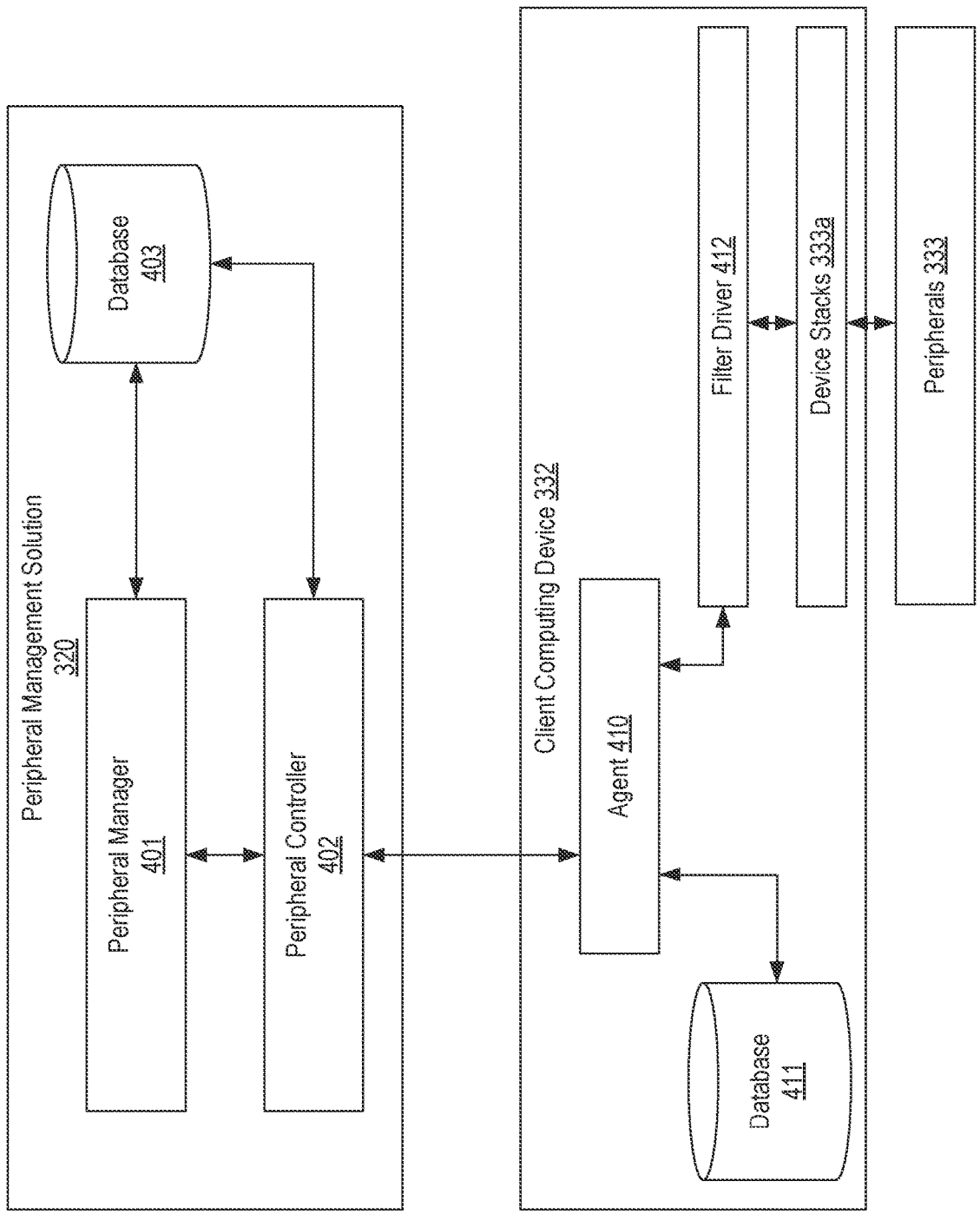
FIG. 4 provides an example of various components that may be employed on a peripheral management solution and a client computing device in accordance with one or more embodiments of the present invention.

FIG. 4 provides an example of various components that may be employed to implement one or more embodiments of the present invention. Peripheral management solution 320 could include a peripheral manager 401 and a peripheral controller 402. The depicted separation of these components is to facilitate the description of the functionality they perform, but this functionality could be implemented using any number and/or arrangement of components in peripheral management solution 320. Peripheral management solution 320 may also include a database 403 for storing information that peripheral manager 401 uses when embodiments of the present invention are implemented. Database 403 can represent any number or type of storage mechanism.

FIG. 4 only depicts client computing device 332. However, each client computing device that may participate in embodiments of the present invention could include the components on client computing device 332 as depicted in FIG. 4. As shown, client computing device 332 can include an agent 410 that interfaces with peripheral management solution 320. Agent 410 may employ or maintain a database 411 for storing information as described below. A filter driver 412 may also be included on client computing device 412 and may be positioned in the device stack(s) 333a for peripherals 333. Although not depicted as separate, there may be different device stacks 333a for at least some of peripherals 333, and therefore in some embodiments, there may be multiple instances of filter driver 412. As one example only, if client computing device 332 runs a version of the Windows operating system, filter driver 412 could be a Windows Driver Framework (WDF) kernel-mode upper filter driver that is layered on top of the USB hub driver (e.g., usbhub3.sys). Agent 410 can also interface with filter driver 412.

FIGS. 5A-5C provide examples of data structures that may be used in one or more embodiments of the present invention. FIG. 5A shows a cube-specific peripheral table 501 that may be stored in database 411 and used by agent 410. FIG. 5B shows a cube-to-peripheral mapping table 502 that may be stored in database 403 and used by peripheral manager 401, among possibly other components. FIG. 5C shows an approved peripheral table 503 that may be stored in database 403 and used by peripheral controller 402. The table format represented in these figures is only one example of how the information may be structured.

Cube-specific peripheral table 501 defines which peripherals are available in a particular hoteling cube 201. As described in greater detail below, agent 410 could create/update cube-specific peripheral table 501 in conjunction with a user of client computing device 332 booking or using a particular hoteling cube 201. Cube-specific peripheral table 501 may define a cube ID for the hoteling cube 201 to which it pertains (e.g., Cube ID1) and may provide various types of information for each peripheral in the hoteling cube 201 such as a peripheral name, a peripheral device ID (e.g., the USB device ID in the form USB\VID_XXXX&PID_YYYY), a peripheral unique ID (e.g., a serial number, container ID or other identifier that can uniquely identify the peripheral), an interface of the peripheral (e.g., USB, Bluetooth, HDMI, etc.), and possibly other information. In the depicted example, it is assumed that the hoteling cube 201 with a cube ID of Cube ID1 includes a USB keyboard, a USB mouse, and a USB webcam with device IDs of Device_ID_1, Device_ID_2 and Device_ID_3 respectively and unique IDs of Unique_ID_1, Unique_ID_2 and Unique_ID_3 respectively. With cube-specific peripheral table 501, agent 410 can determine which peripherals should be available for a workspace in the respective hoteling cube 201.

Cube-to-peripheral mapping table 502 is a combination of the information of each cube-specific peripheral table 501 along with an identification of the time slots for which each hoteling cube 201 is booked/reserved. For example, the first row in cube-to-peripheral mapping table 502 matches the content of cube-specific peripheral table 501 as shown in FIG. 5A and also defines that the respective hoteling cube 201 is booked on Feb. 18, 2022 between 10:00 am and 5:00 pm. Cube-to-peripheral mapping table 502 also includes a row for the hoteling cube 201 having a cube ID of Cube ID2 and a row for the hoteling cube 201 having a cube ID of Cube ID3. Peripheral manager 401 can compile/update cube-to-peripheral mapping table 502 in database 403 in any suitable manner such as by interfacing with hoteling management system 310. Peripheral manager 401 can also share the relevant portions of cube-to-peripheral mapping table 502 with agent 410 to allow agent 410 to create/update cube-specific peripheral table 501.

Approved peripheral table 503 is used to define a user's peripherals that have been approved for use in a workspace. Accordingly, approved peripheral table 503 can associate a user's user ID with similar information as defined in cube-specific peripheral table 501. For example, approved peripheral table 503 indicates that the user with a user ID of User-1 ID can use his or her USB headset with the device ID of Device_ID_11 and the unique ID of Unique_ID_11 in any workspace that the user may establish in hoteling cubes 201.

Figure 6A:
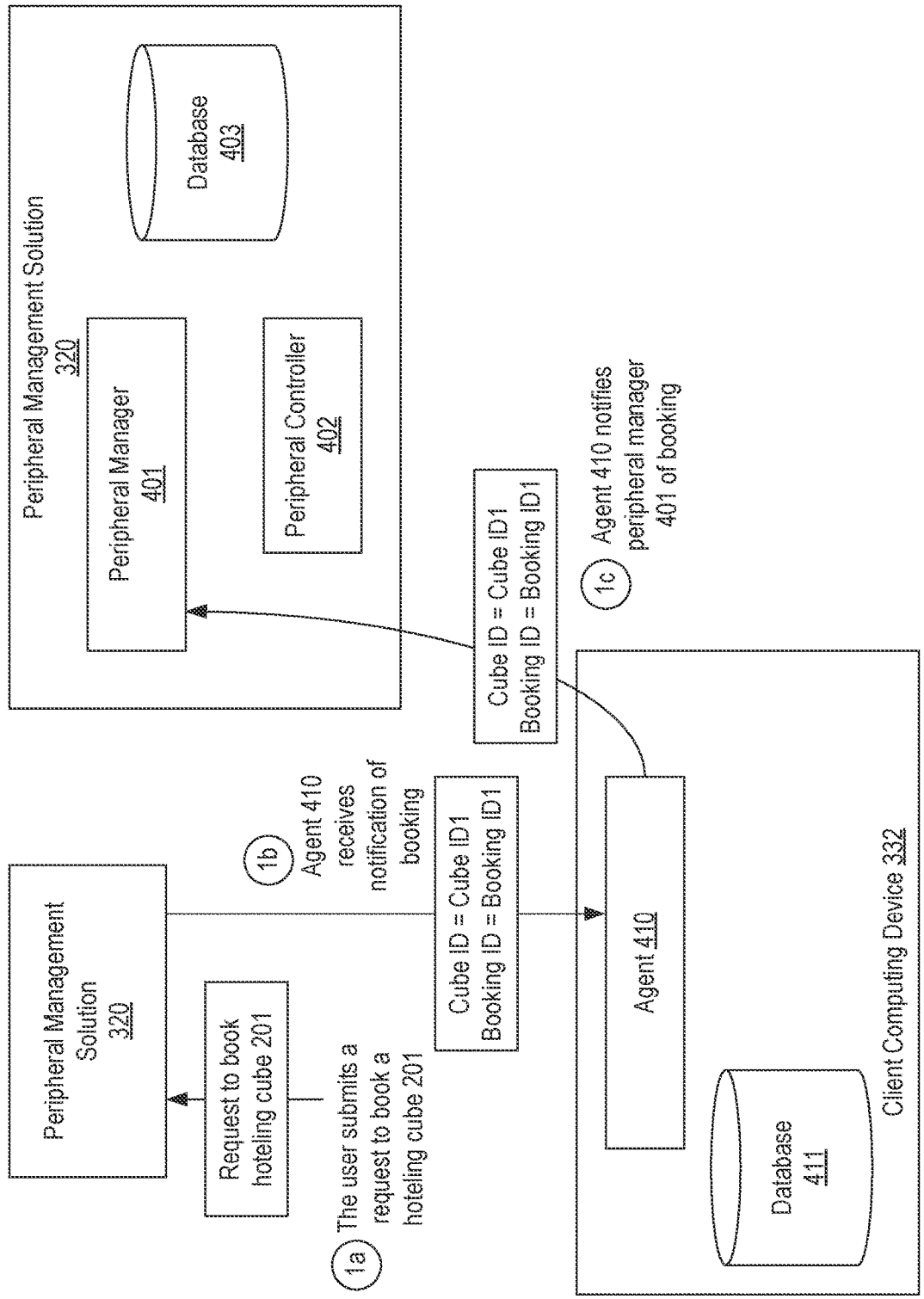
FIGS. 6A and 6B provide an example of initial functionality that can be performed when a user books a hoteling cube to facilitate management of peripherals in a workspace in the hoteling cube in accordance with one or more embodiments of the present invention.
Figure 6B:
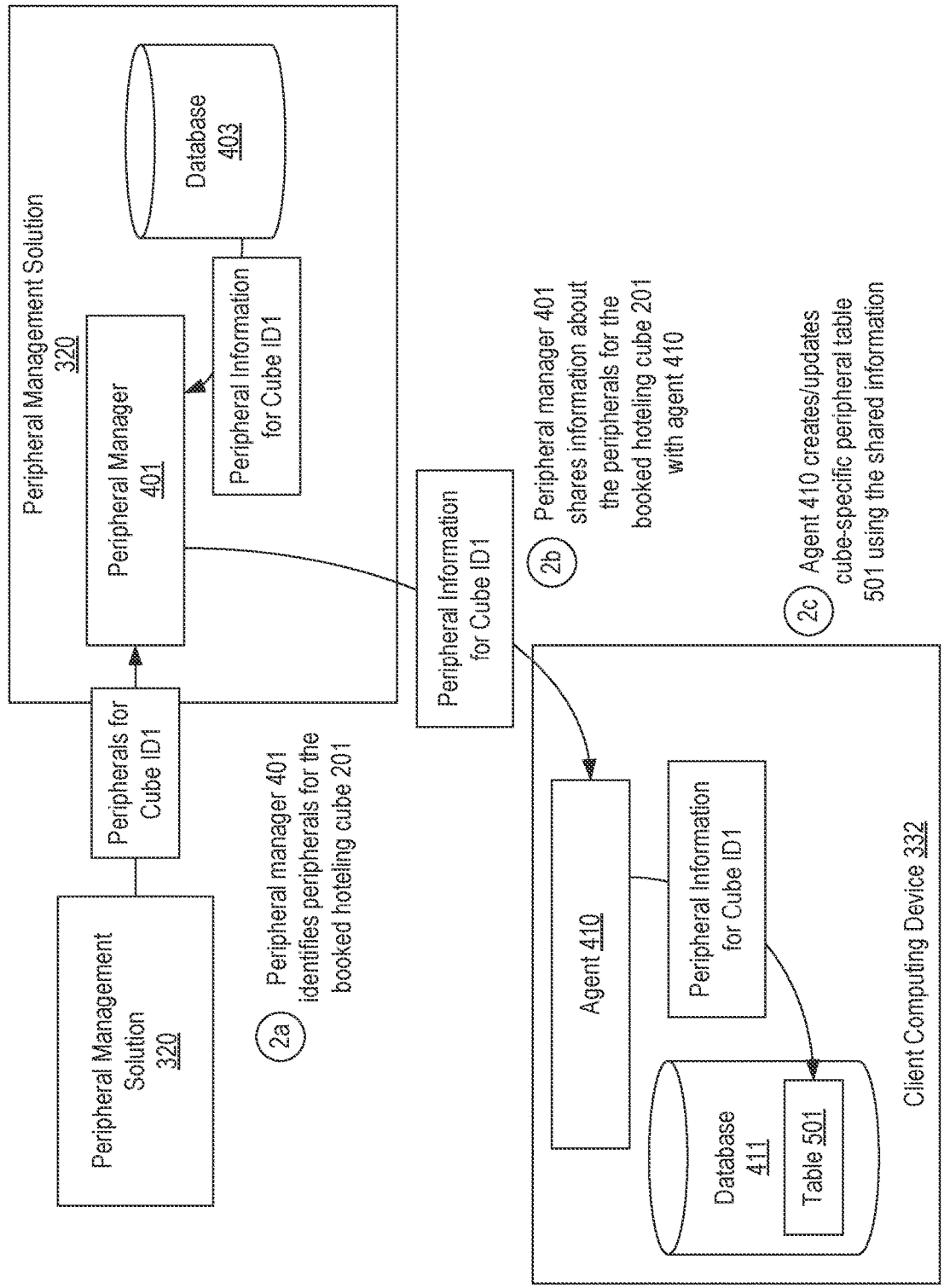

FIGS. 6A and 6B provide an example of initial functionality that can be performed when a user books a hoteling cube 201 to facilitate management of peripherals in a workspace in the hoteling cube 201. Turning to FIG. 6A, in step 1a, it is assumed that the user submits a request to peripheral management solution 320 to book a hoteling cube 201. The user could submit this request from client computing device 332, from another client computing device or in some other manner. In step 1b, and in response to peripheral management solution 320 booking a hoteling cube 201 for the user, agent 410 can receive a notification of the booking. For example, peripheral management solution 320 could send a notification to agent 410 that includes the cube ID of the booked cube (e.g., Cube ID1) and a booking ID for the booking (e.g., Booking ID1), among possibly other information such as the time of the booking and the user ID of the user. Agent 410 could receive this notification in any suitable manner such as by registering for such notifications via an API that peripheral management solution 320 provides. In step 1c, agent 410 can notify peripheral manager 401 of the booking. For example, agent 410 could send the cube ID and the booking ID received in step 1b. In this way, peripheral manager 401 is informed of which hoteling cube 201 the user intends to use and when.

Turning to FIG. 6B, in step 2a and in response to being notified of the booking, peripheral manager 401 can identify which peripherals are available in the booked hoteling cube 201. For example, peripheral manager 401 could interface with one or more components of peripheral management solution 320 and/or query database 403 (e.g., cube-to-peripheral mapping table 502) to obtain such information. In step 2b, peripheral manager 401 can share the peripheral information for the peripherals available in the booked hoteling cube 201 with agent 410. Then, in step 2c, agent 410 can use the received peripheral information to create/update cube-specific peripheral table 501. At this point, agent 410 can know which peripherals will be available for a workspace in the booked hoteling cube 201.

Figure 7A:
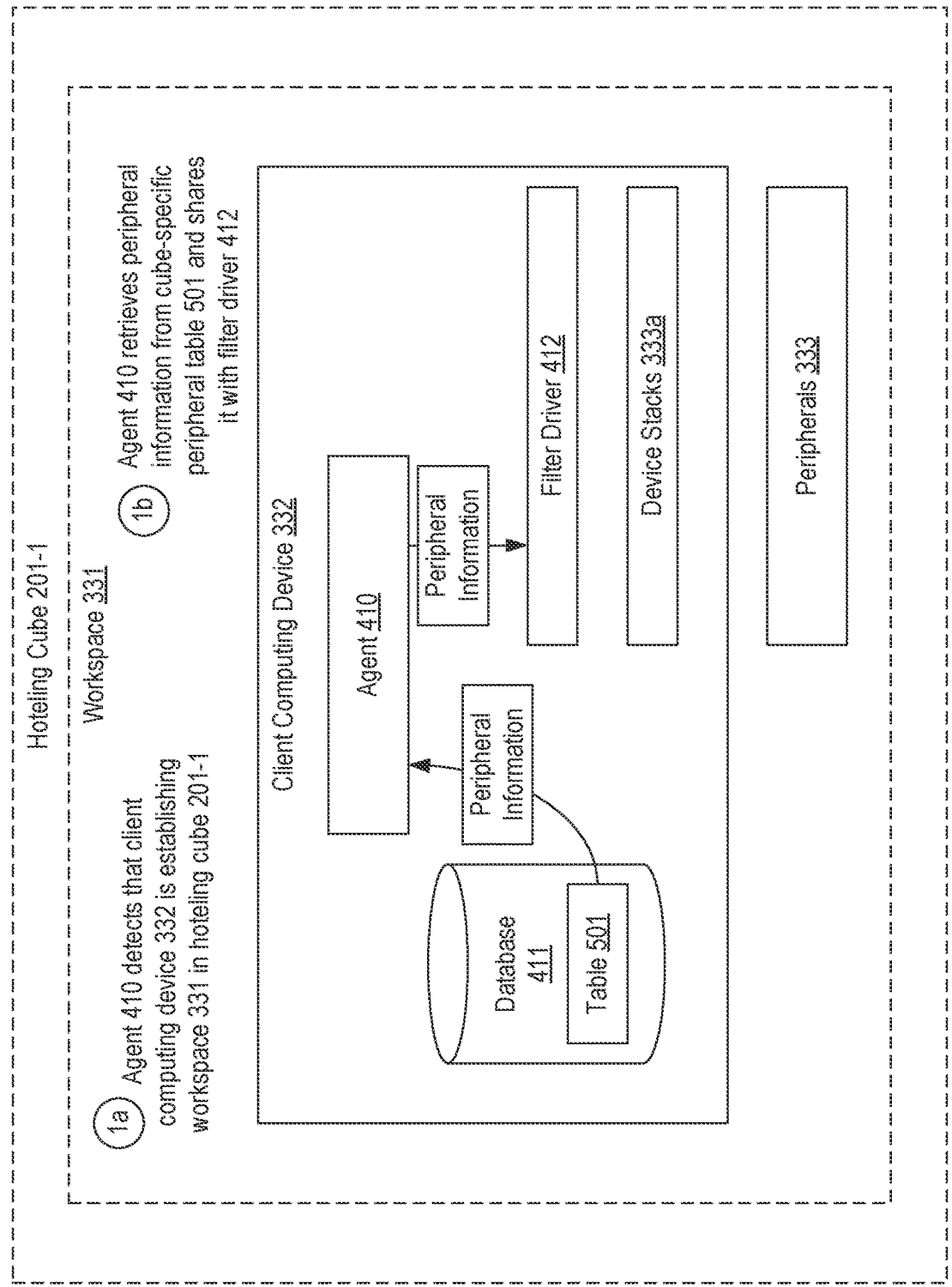
FIGS. 7A and 7B provide an example of how the use of peripherals in a workspace can be restricted in accordance with one or more embodiments of the present invention.
Figure 7B:
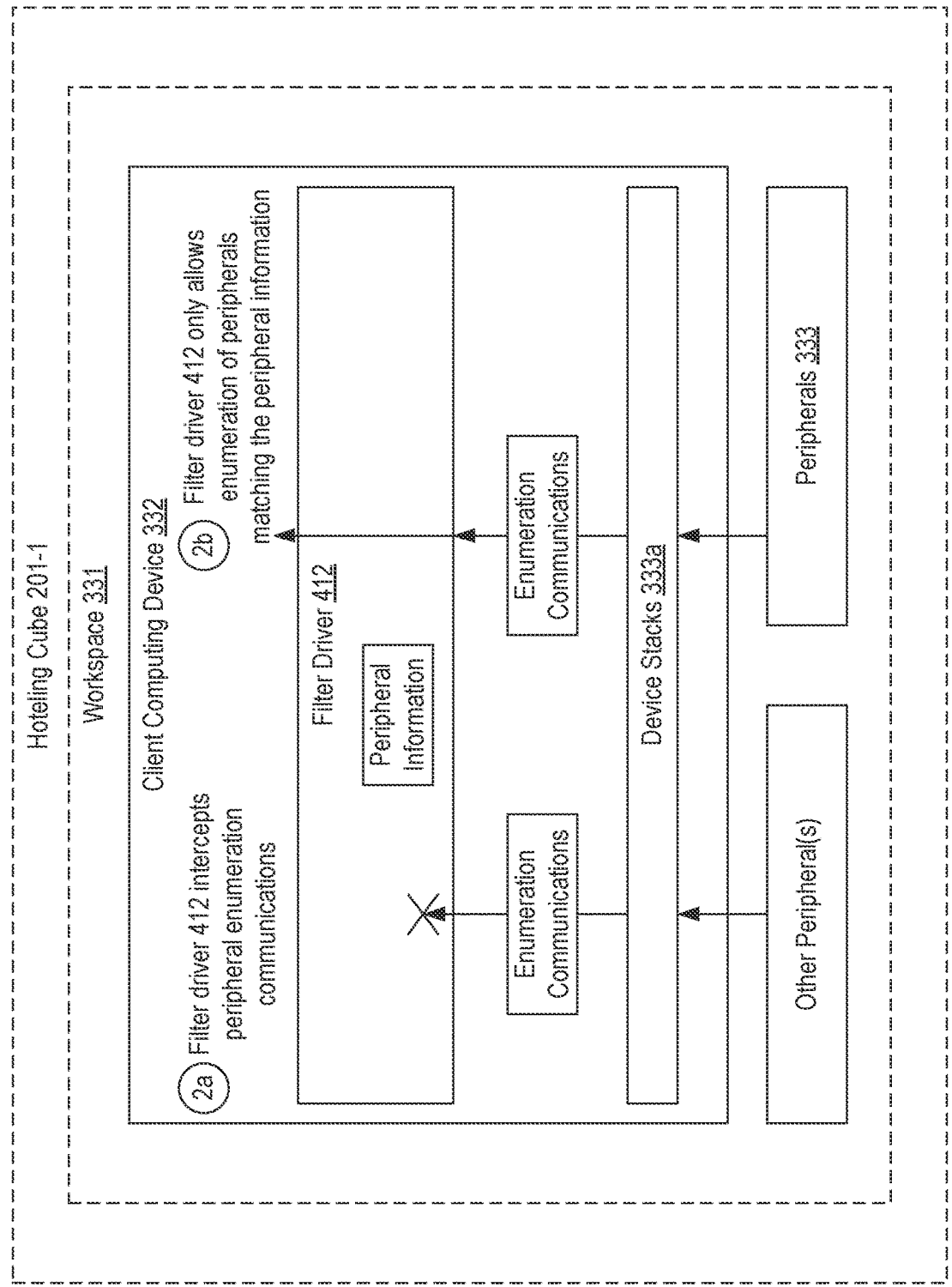

FIGS. 7A and 7B provide an example of how the use of peripherals in a workspace can be restricted in accordance with one or more embodiments of the present invention. This example is based on the example of FIGS. 6A and 6B. In FIG. 7A, it is assumed that the user is present at hoteling cube 201-1 (Cube ID1) and is attempting to establish a workspace. For example, the user could have connected client computing device 332 to a dock or network cable in hoteling cube 201-1, could have provided login credentials to peripheral management solution 320, or provided any other indication that client computing device 332 would be used in hoteling cube 201-1. In step 1b, agent 410 can retrieve the peripheral information pertaining to hoteling cube 201-1 (e.g., using the Cube ID) and provide it to filter driver 412. For example, with reference to FIG. 5A, agent 410 could send filter driver 412 at least the peripheral device IDs and peripheral unique IDs from cube-specific peripheral table 501. For purposes of this example, it is assumed that peripherals 333 are those identified in cube-specific peripheral table 501.

Turning to FIG. 7B, it is now assumed that peripherals 333 and other peripheral(s) have been connected to client computing device 332 and that the enumeration process is being performed to make these peripherals accessible on client computing device 332. In some embodiments, agent 410 could be configured to reset all peripherals to trigger the enumeration process (e.g., to address scenarios where a peripheral may already be connected and accessible). In step 2*a*, filter driver 412 can intercept the peripheral enumeration communications. For example, in Windows-based implementations, filter driver 412 could be configured to evaluate I/O request packets (IRPs) of type IRP_MN_QUERY_ID to determine whether the IDs included in the IRPs match those in the peripheral information. If so, filter driver 412 can allow the enumeration process to proceed to thereby cause the peripheral to become available. If not, filter driver 412 can cause the enumeration process to fail so that the peripheral does not become available (e.g., by changing the peripheral's device ID to an invalid value). In FIG. 2, and based on the assumption that peripherals 333 are those defined in the peripheral information, filter driver 412 will allow the enumeration of peripherals 333 to proceed but will not allow the enumeration of the other peripheral(s) to compete successfully. For example, the other peripheral(s) could represent a peripheral that the user took from another hoteling cube 201 or brought from home. In some embodiments, when filter driver 412 blocks a peripheral, agent 410 can be notified and can in turn notify the user. In such cases, the user may pursue permission to connect the blocked peripheral such as is described below.

In some embodiments, when filter driver 412 blocks a peripheral, it may provide peripheral information for the blocked peripheral to agent 410 which in turn can provide the peripheral information and the cube ID to peripheral controller 402. Peripheral controller 402 could then notify an administrator that the peripheral has been blocked. In some embodiments, peripheral controller 402 may first determine whether the blocked peripheral is included in cube-to-peripheral mapping table 502 and, if so, can then notify the administrator to thereby inform the administrator that the blocked peripheral is in the wrong hoteling cube 201.

FIGS. 8A-8D provide an example of how the movement of peripherals between hoteling cubes 201 can be managed in accordance with one or more embodiments of the present invention. This example continues the examples from above and therefore assumes that client computing device 332 is part of workspace 331 in hoteling cube 201-1. However, the functionality described in this example could be performed for any workspace in any hoteling cube 201.

Figure 8A:
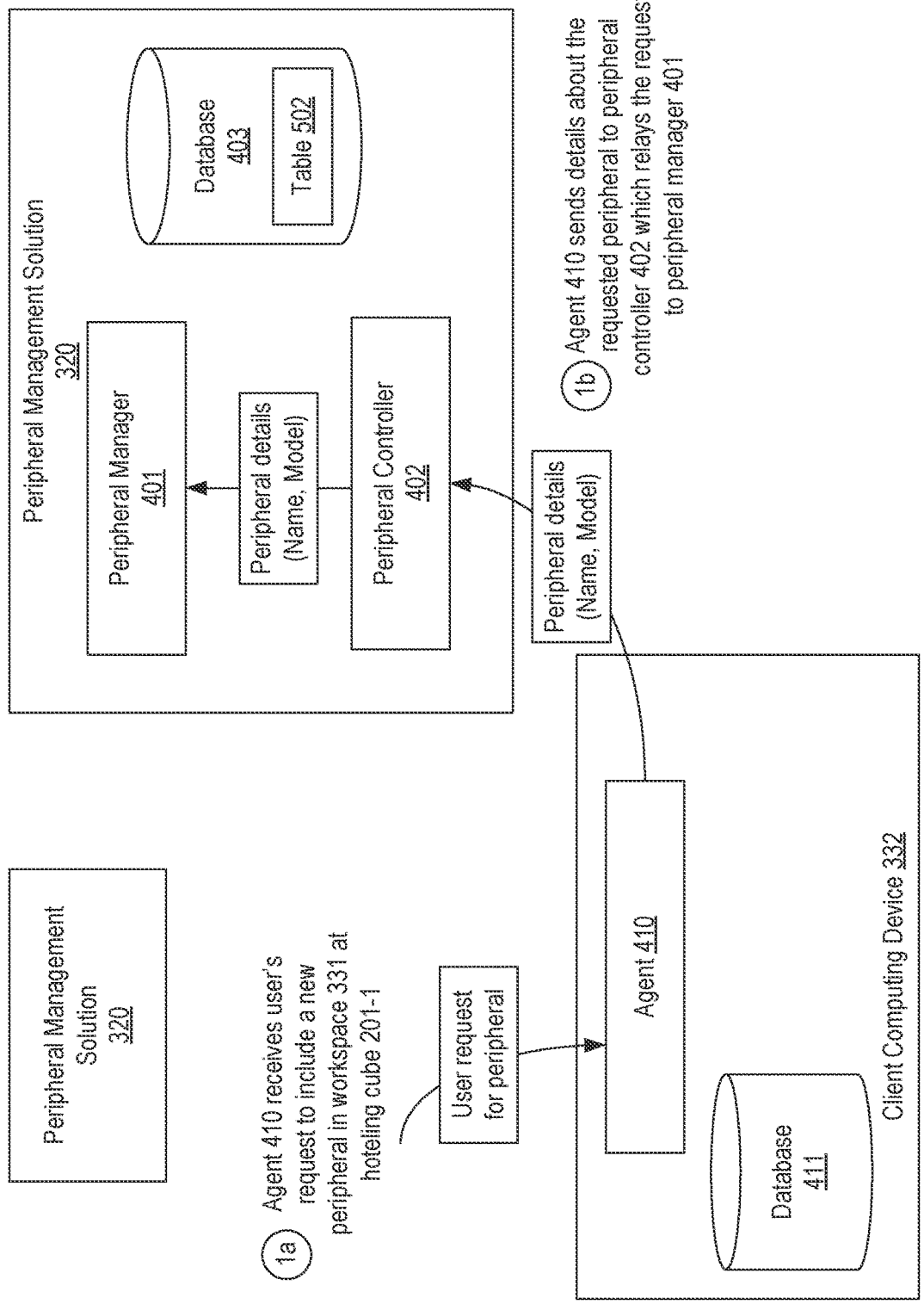
FIGS. 8A-8D provide an example of how the movement of peripherals between hoteling cubes can be managed in accordance with one or more embodiments of the present invention.

Turning to FIG. 8A, in step 1*a*, it is assumed that agent 410 receives a request from the user to include a new peripheral in workspace 331 at hoteling cube 201-1. For example, the user of client computing device 332 may desire to connect a 4K display to client computing device 332 as part of workspace 331. In step 1*b*, agent 410 can send details about the requested peripheral to peripheral controller 402 which in turn can relay the peripheral details to peripheral manager 401. These peripheral details could include a name and/or model of the requested peripheral or other general information that identifies the type of peripheral that is being requested.

Figure 8B:
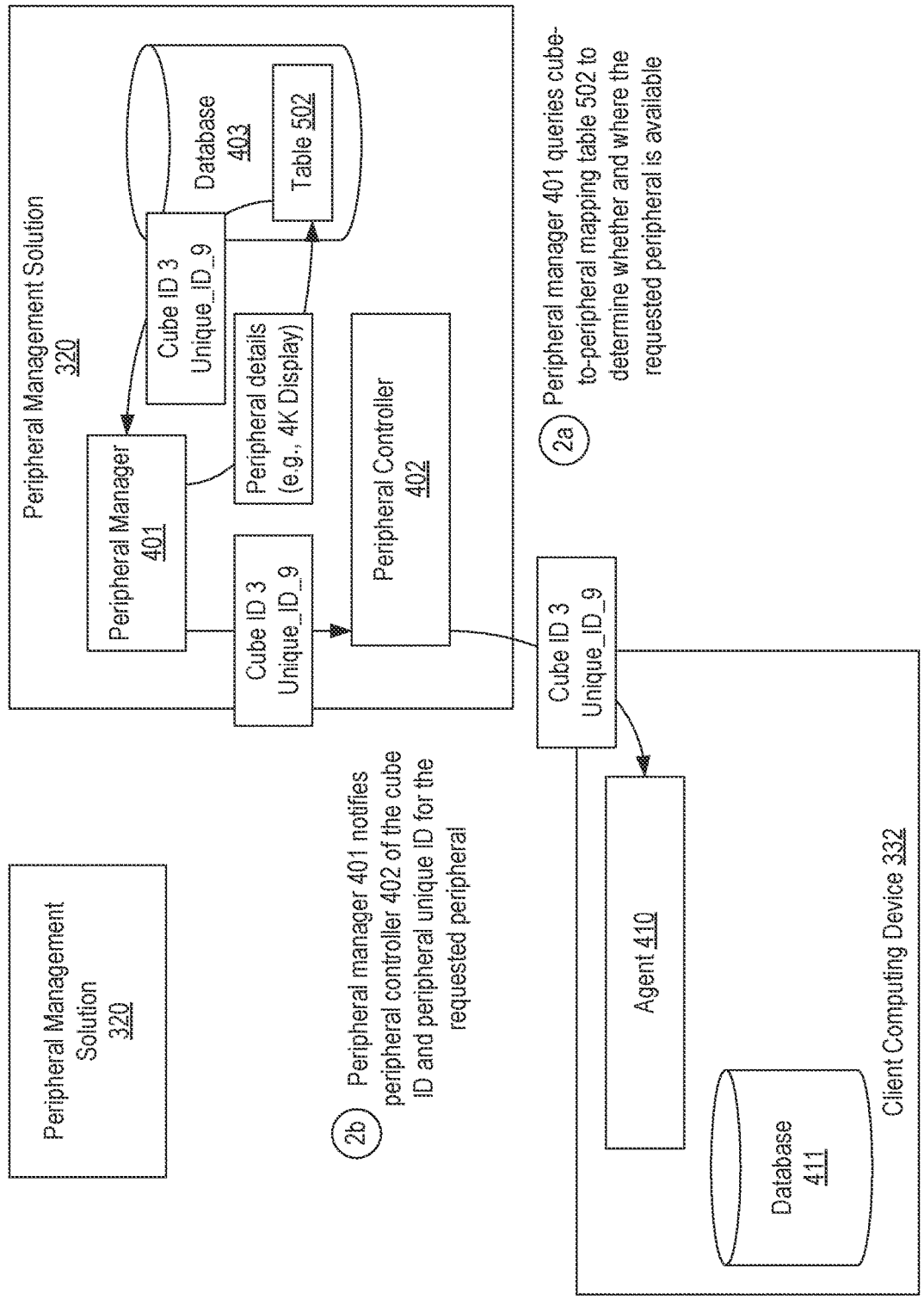

Turning to FIG. 8B, in step 2*a*, peripheral manager 401 can use the peripheral details to query cube-to-peripheral mapping table 502 to determine whether and where the requested peripheral is available. For example, peripheral manager 401 could determine whether a 4K monitor is available in any hoteling cube 201 that is not currently booked. With reference to FIG. 5B, it is assumed that the hoteling cube 201 with the cube ID of Cube ID3 has a 4K display and is not currently booked. Accordingly, peripheral manager 401 could obtain Cube ID3 and Unique_ID_9 from cube-to-peripheral mapping table 502. In step 2*b*, peripheral manager 401 can notify peripheral controller 402 that the requested peripheral is available and can identify the hoteling cube 201 where it is available. For example, peripheral manager 401 could return Cube ID 3 and Unique_ID_9 to peripheral controller 402 which in turn could return this peripheral information to agent 410 (possibly with the device ID if not already known to agent 410).

Figure 8C:
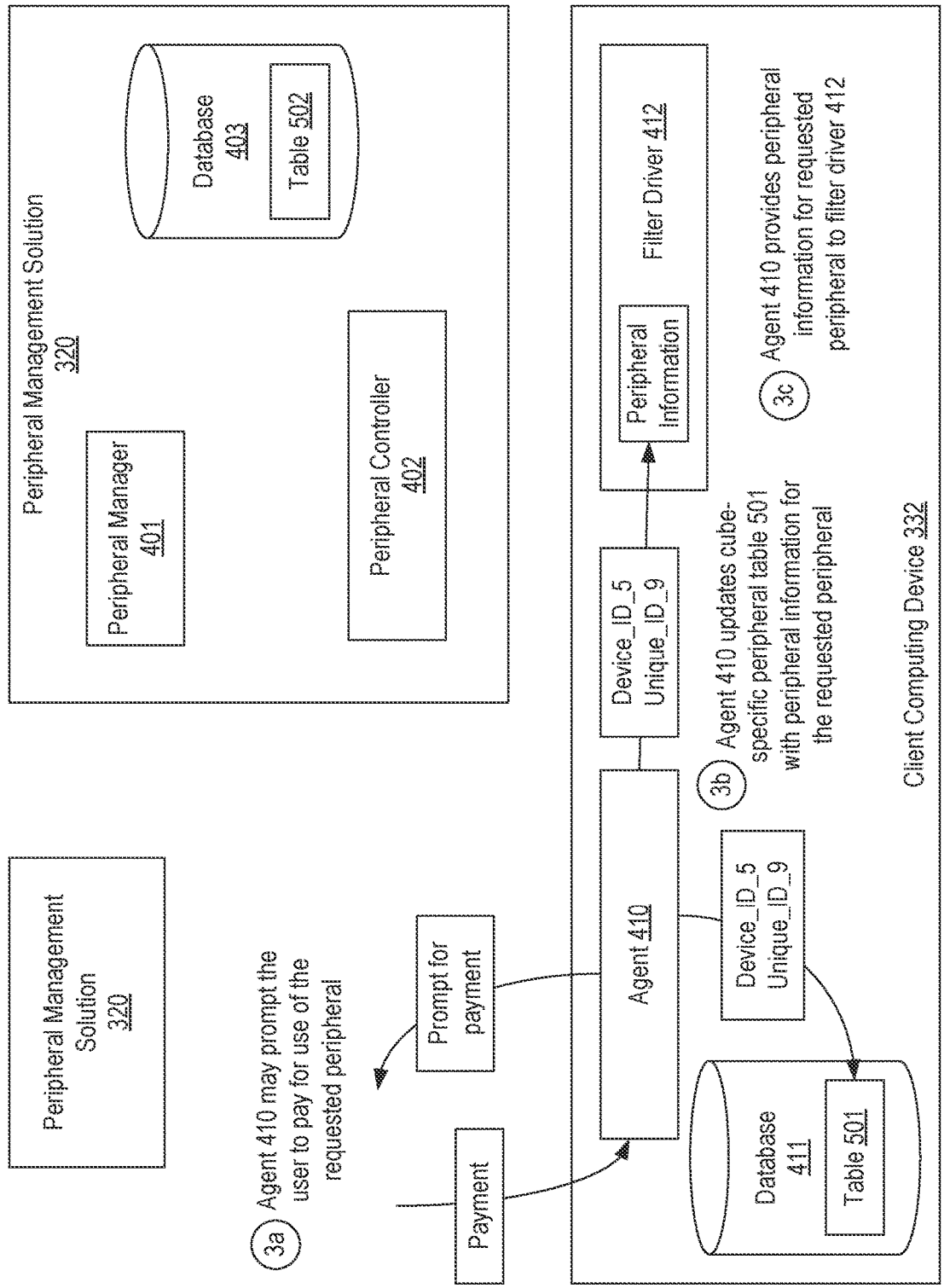

Turning to FIG. 8C, in step 3*a*, which may be optional, agent 410 may prompt the user to pay for the use of the requested peripheral or otherwise accept the requested peripheral. As part of or in conjunction with step 3*a*, agent 410 can also notify the user where the requested peripheral is located so that the user can retrieve it (e.g., by presenting the Cube ID or other information about the hoteling cube 201 where the requested peripheral is located). In step 3*b*, and assuming the user has paid for or otherwise accepted the requested peripheral, agent 410 can update cube-specific peripheral table 501 to include the peripheral information for the requested peripheral. In step 3*c*, agent 410 can also provide the peripheral information for the requested peripheral to filter driver 412 so that filter driver 412 will allow the requested peripheral to be enumerated on client computing device 332 as described with reference to FIG. 7B.

Figure 8D:
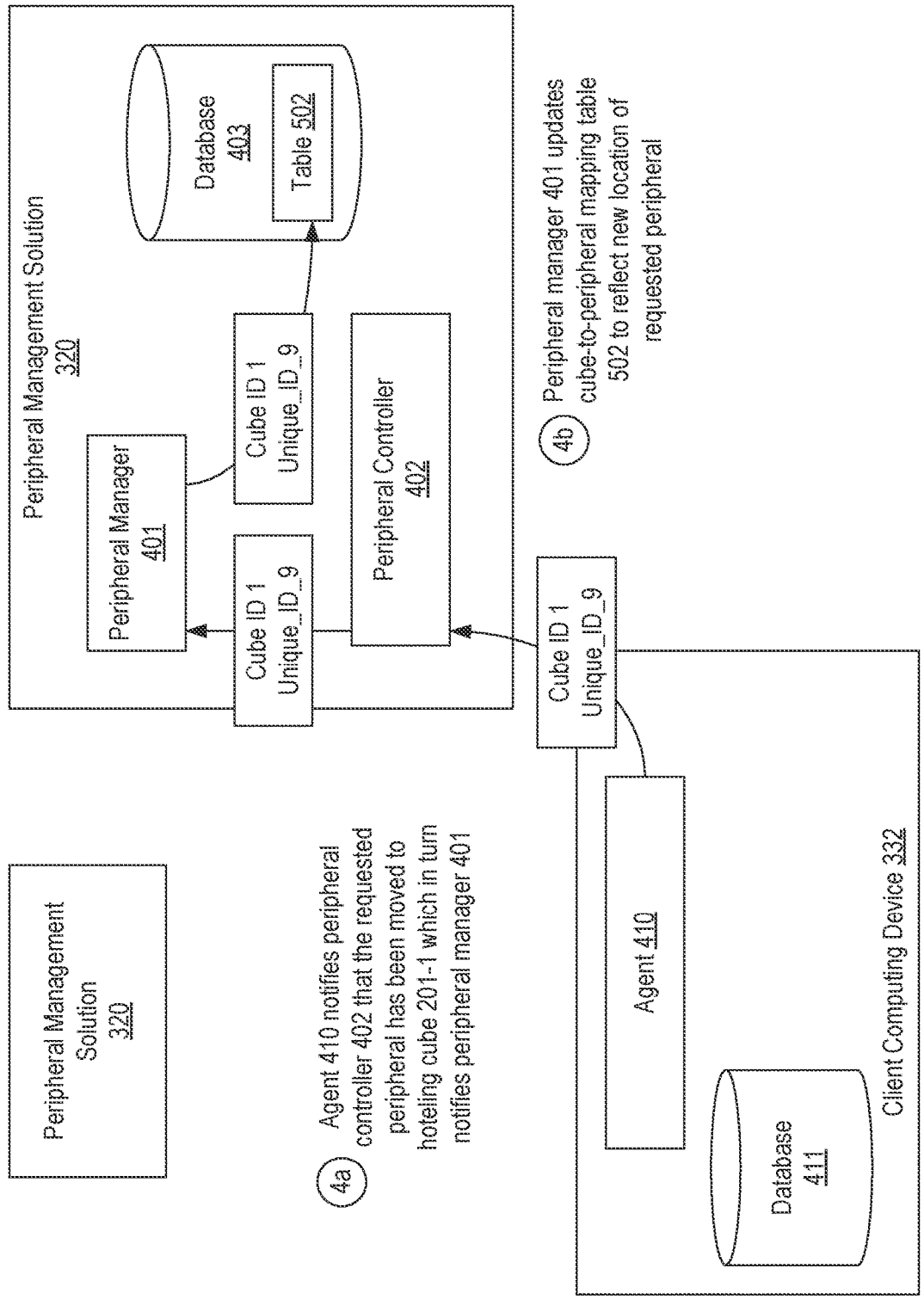

Turning to FIG. 8D, in step 4*a*, agent 410 can notify peripheral manager 401 via peripheral controller 402 that the requested peripheral has been moved to hoteling cube 201-1 such as by providing the cube ID (Cube ID 1) and the peripheral unique ID (Unique_ID_9) as part of a request to update cube-to-peripheral mapping table 502. In step 4*b*, peripheral manager 401 can update cube-to-peripheral mapping table 502 to reflect the new location of the requested peripheral. For example, with reference to FIG. 5B, the information for the 4K display could be moved from the entry for Cube ID 3 to the entry for Cube ID1.

The process depicted in FIGS. 8A-8D can be performed whenever the user a client computing device requests to use a peripheral that is not available/allowed in the hoteling cube 201 where the client computing device has or intends to create a workspace. Accordingly, the depicted process could be performed prior to or after the user has created the workspace.

Figure 9A:
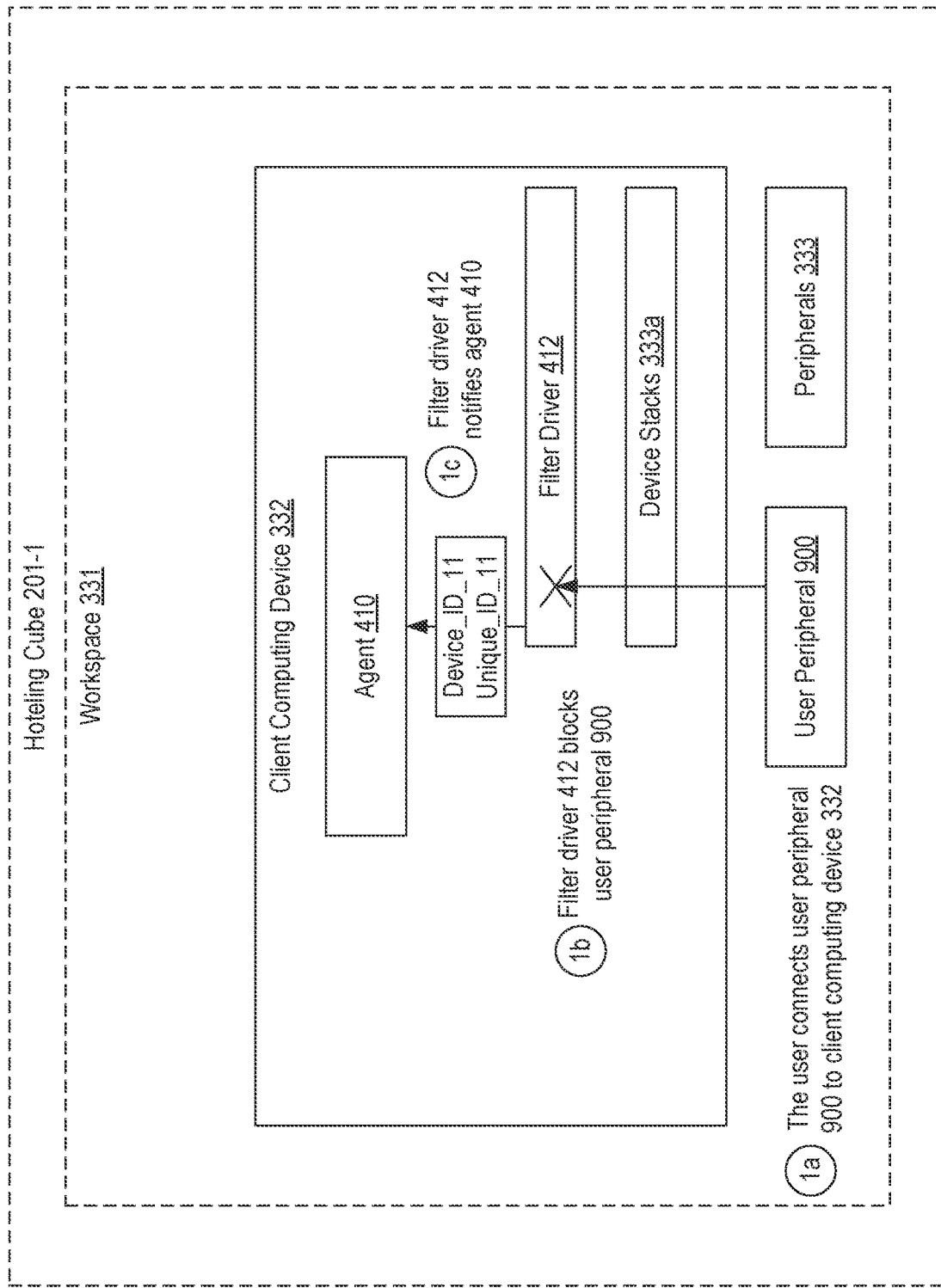
FIGS. 9A-9C provide an example of how user peripherals can be managed in accordance with one or more embodiments of the present invention.
Figure 9B:
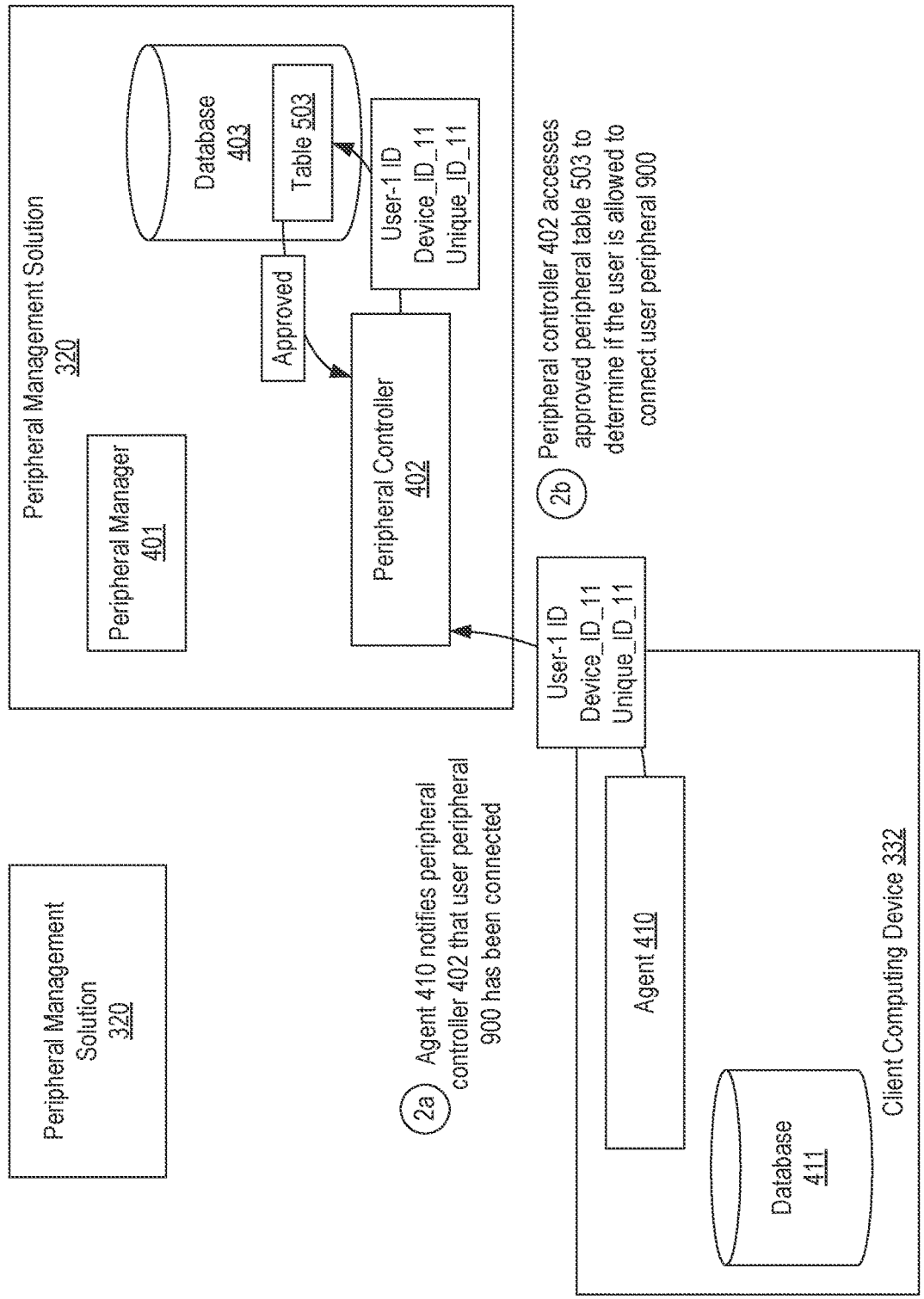
Figure 9C:
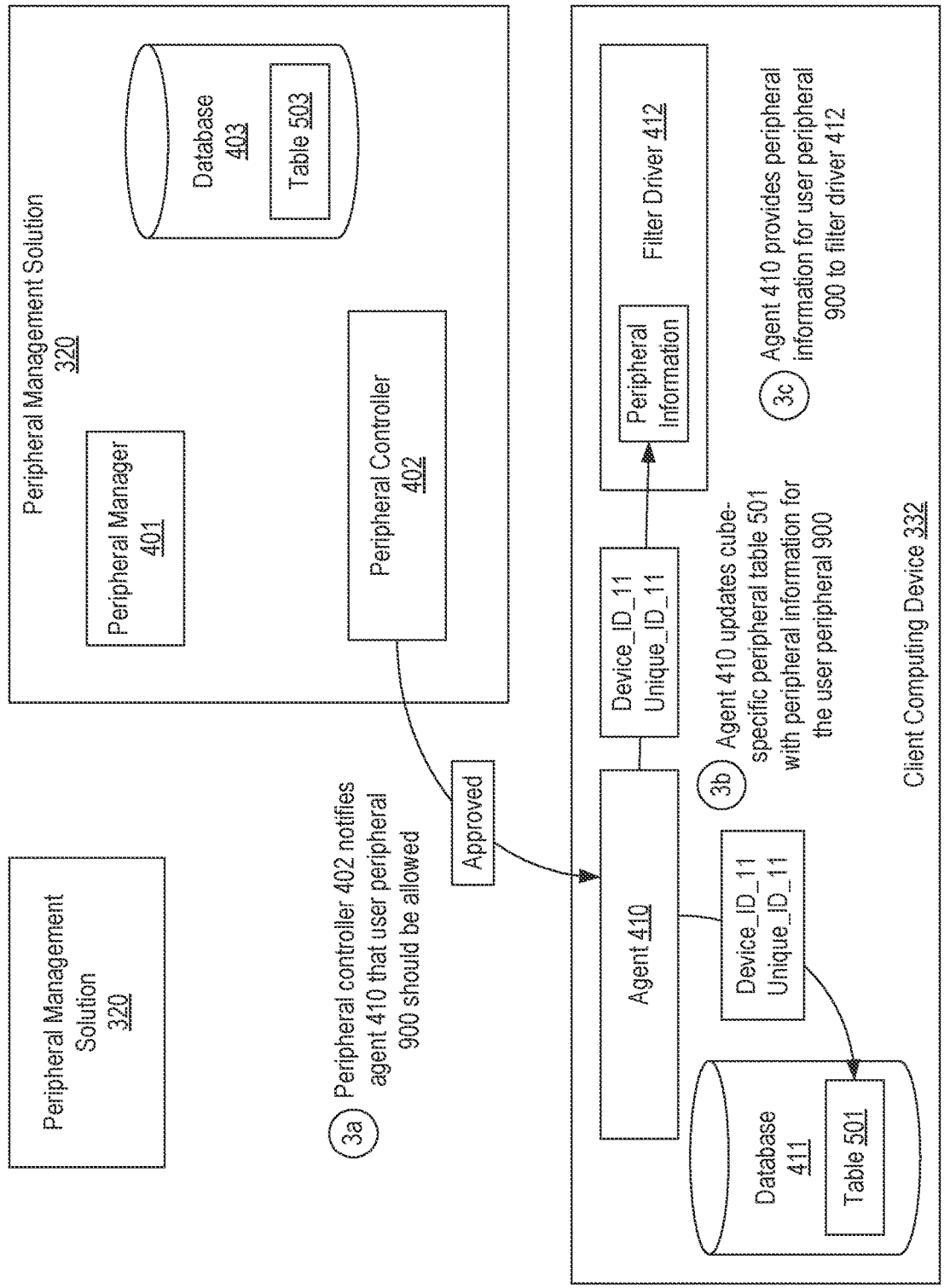

FIGS. 9A-9C provide an example of how user peripherals can be managed in accordance with one or more embodiments of the present invention. In this context, a user peripheral could be any peripheral that a user may bring for use in a workspace at a hoteling cube 201 and should be distinguished from peripherals that may be dedicated for use within hoteling cubes 201.

Turning to FIG. 9A, in step 1*a*, it is assumed to that user connects a user peripheral 900 to client computing device 332 while client computing device 332 forms workspace 331 in hoteling cube 201-1. It is also assumed that the user has the user ID of User-1 ID and user peripheral 900 is the USB headset included in approved peripheral table 503. In step 1*b*, filter driver 412 may initially block user peripheral 900 in accordance with the process shown in FIGS. 7A and 7B because cube-specific peripheral table 501 does not include user peripheral 900's peripheral information. In step 1c, filter driver 412 can notify agent 410 that user peripheral 900 has been connected and may provide the device ID and unique ID for user peripheral 900.

Turning to FIG. 9B, in step 2a, agent 410 can notify peripheral controller 402 that user peripheral 900 has been connected. For example, agent 410 could provide the user ID (User-1 ID), the peripheral device ID (Device_ID_11) and the peripheral unique ID (Unique_ID_11) to peripheral controller 402. In step 2b, peripheral controller 402 can access approved peripheral table 503 to determine whether user peripheral 900 should be allowed while client computing device 332 is part of workspace 331 at hoteling cube 201-1. In this case, peripheral controller 402 will determine that approved peripheral table 503 dictates that the user is allowed to connect user peripheral 900.

Turning to FIG. 9C, in step 3a, peripheral controller 402 can notify agent 410 that user peripheral 900 should be allowed. In step 3b, agent 410 can update cube-specific table 501 to include the peripheral information for user peripheral 900. In step 3c, agent 410 can provide the peripheral information for user peripheral 900 to filter driver 412. At this point, filter driver 412 will allow user peripheral 900 to be enumerated and may reset user peripheral 900 to cause such enumeration. Accordingly, to allow a user to include a user peripheral in his or her workspaces, an administrator need only include the peripheral information for the user peripheral in peripheral table 503.

Although not shown in the figures, approved peripheral table 503 could define limitations on how a user peripheral may be connected and such limitations could be provided to filter driver 412 and/or other component(s) on client computing device 332 to enforce such limitations. For example, approved peripheral table 503 could define that a user storage drive can be connected with read-only access. As another example, approved peripheral table 503 could define a time period during which a user peripheral will be allowed.

In some embodiments, peripheral manager 401 may be configured to automatically assign peripherals to hoteling cubes 201 when the peripherals are added to hoteling management system 310. For example, peripheral manager 401 can track which hoteling cubes 201 (or users using the hoteling cubes) have requested a particular type of peripheral. Based on such requests, peripheral manager 401 can determine the best hoteling cube 201 to which a new peripheral should be assigned. For example, if users in hoteling cube 201-1 routinely request a 4K display, peripheral manager 401 may automatically assign a new 4K display to hoteling cube 201-1 including defining such assignment in cube-to-peripheral mapping table 502 and instructing an administrator to place the 4K monitor in hoteling cube 201-1. In other embodiments, peripheral manager 401 could be configured to automatically detect manual assignments of peripherals to hoteling cubes 201, such as by interfacing with hoteling management system 310, and can automatically update cube-to-peripheral mapping table 502 to reflect the manual assignments.

The above-described techniques may also be applied to gaming scenarios or other scenarios where different users may connect their peripherals to the same client computing device (i.e., when different users include their peripherals in a workspace). In such scenarios, allowed peripheral table 503 may be used to define which peripherals a particular user may connect. For example, if a first user (User-1 ID) invites a second user (User-2 ID) to participate in group-play on the first user's client computing device, the process represented in FIGS. 9A-9C could be performed to ensure that filter driver 412 will allow the second user's peripherals (e.g., a game controller) to be connected. In such embodiments, limitations could be placed on the second user's peripherals such as allowing them only during a window defined by the first user.

In summary, embodiments of the present invention enable peripherals to be managed in a variety of ways in workspace environments. By implemented embodiments of the present invention, an administrator can be freed from the burdens and limitations of manually tracking and managing peripherals.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing peripherals in a workspace environment, the method comprising:
    in conjunction with a user booking a hoteling cube, identifying one or more peripherals that are associated with the hoteling cube;
    caching peripheral information for the one or more peripherals on a client computing device;
    in conjunction with determining that the client computing device is establishing a workspace at the hoteling cube, using the peripheral information to allow the one or more peripherals to be included in the workspace while preventing one or more other peripherals from being included in the workspace;
    detecting that the user has connected a user peripheral to the client computing device;
    using, on the client computing device, the peripheral information to determine that the user peripheral should be prevented from being included in the workspace;
    notifying a peripheral controller indicating that the user peripheral has been connected to the client computing device;
    in response to the peripheral controller indicating that the user peripheral is approved to be included in the workspace, allowing the user peripheral to be included in the workspace.

2. The method of claim 1, wherein a peripheral management solution provides the peripheral information to an agent on the client computing device.

3. The method of claim 2, wherein the peripheral management solution obtains the peripheral information from a cube-to-peripheral mapping table.

4. The method of claim 1, wherein using the peripheral information to allow the one or more peripherals to be included in the workspace while preventing the one or more other peripherals from being included in the workspace comprises evaluating enumeration communications.

5. The method of claim 4, wherein a filter driver evaluates the enumeration communications against the peripheral information.

6. The method of claim 1, further comprising:
    receiving a request from the user to include an additional peripheral in the workspace;
    identifying a different hoteling cube that is associated with the additional peripheral;
    caching peripheral information for the additional peripheral; and
    using the peripheral information for the additional peripheral to allow the additional peripheral to be included in the workspace.

7. The method of claim 6, further comprising:
    notifying the user of the different hoteling cube to enable the user to retrieve the additional peripheral.

8. The method of claim 6, further comprising:
    prompting the user to provide payment for including the additional peripheral in the workspace.

9. The method of claim 6, further comprising:
    associating the additional peripheral with the hoteling cube.

10. The method of claim 1, wherein a filter driver uses the peripheral information to determine that the user peripheral should be prevented from being included in the workspace.

11. The method of claim 10, wherein the filter driver allows the user peripheral to be included in the workspace.

12. The method of claim 1, wherein notifying the peripheral controller that the user peripheral has been connected to the client computing device comprises sending one or more identifiers of the user peripheral to the peripheral controller.

13. One or more non-transitory computer storage media storing computer executable instructions which when executed implement a method for managing peripherals in a workspace environment, the method comprising:
    receiving, from a client computing device, a request to include a first peripheral in a workspace that the client computing device has established or will establish at a first hoteling cube;
    determining that the first peripheral is associated with a second hoteling cube;
    notifying an agent on the client computing device that the first peripheral is available at the second hoteling cube;
    notifying a user of the client computing device that the first peripheral is available at the second hoteling cube;
    providing peripheral information to a filter driver on the client computing device;
    using, by the filter driver, the peripheral information to allow the first peripheral to be included in the workspace at the first hoteling cube;
    detecting that the user has connected a user peripheral to the client computing device;
    using, on the client computing device, the peripheral information to determine that user peripheral should be prevented from being included in the workspace;
    notifying a peripheral controller that the user peripheral has been connected to the client computing device; and
    in response to the peripheral controller indicating that the user peripheral is approved to be included in the workspace, allowing the user peripheral to be included in the workspace.

14. The computer storage media of claim 13, wherein the method further comprises:
    associating the first peripheral with the first hoteling cube.

15. The computer storage media of claim 13, wherein the method further comprises:
    using, by a filter driver on the client computing device, the peripheral information to allow one or more peripherals to be included in the workspace while preventing one or more other peripherals form being included in the workspace.

16. A method for managing peripherals in a workspace environment, the method comprising:
    retrieving, by an agent executing on a client computing device, peripheral information for one or more peripherals that are associated with a hoteling cube at which a user of the client computing device has established or will establish a workspace;
    sharing, by the agent, the peripheral information with a filter driver on the client computing device;
    when the user has connected the one or more peripherals to the client computing device at the hoteling cube, using, by the filter driver, the peripheral information to determine that the one or more peripherals should be included in the workspace;
    detecting that the user has connected a user peripheral to the client computing device;
    using, on the client computing device, the peripheral information to determine that the user peripheral should be prevented from being included in the workspace;
    notifying a peripheral controller that the user peripheral has been connected to the client computing device; and in response to the peripheral controller indicating that the user peripheral is approved to be included in the workspace, allowing the user peripheral to be included in the workspace.

17. The method of claim 16, further comprising:
receiving, by the agent, a request from the user to include an additional peripheral in the workspace;
receiving, by the agent, an indication that the additional peripheral is available at a different hoteling cube;
notifying the user that the additional peripheral is available at the different hoteling cube;
sharing, by the agent, peripheral information for the additional peripheral with the filter driver; and
when the user has connected the additional peripheral to the client computing device at the hoteling cube, using, by the filter driver, the peripheral information for the additional peripheral to determine that the additional peripheral should be included in the workspace.

* * * * *